No. 821,658. PATENTED MAY 29, 1906.
J. P. LOTZER.
TIRE COUPLING.
APPLICATION FILED MAY 29, 1905.

WITNESSES.
F. O. Tanner.
C. McNamara.

INVENTOR
JOSEPH P. LOTZER
BY Paul & Paul
HIS ATTORNEYS.

UNITED STATES PATENT OFFICE.

JOSEPH P. LOTZER, OF KENT, MINNESOTA.

TIRE-COUPLING.

No. 821,658.	Specification of Letters Patent.	Patented May 29, 1906.

Application filed May 29, 1905. Serial No. 262,746.

*To all whom it may concern:*

Be it known that I, JOSEPH P. LOTZER, of Kent, Wilkin county, Minnesota, have invented certain new and useful Improvements in Tire-Couplings, of which the following is a specification.

The object of my invention is to provide a coupling by means of which the ends of a wheel-tire can be rigidly secured together without welding.

A further object is to provide a coupling by means of which a wide tire can be secured on a narrow felly.

Other objects of the invention will appear from the following detailed description.

The invention consists generally in various constructions and combinations, all as hereinafter described, and particularly pointed out in the claims.

Figure 2:
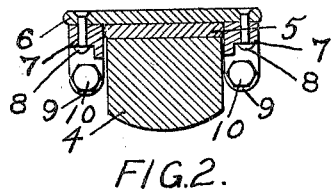
Figure 3:
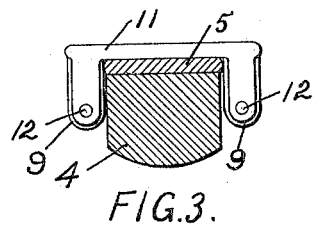
Figure 1:
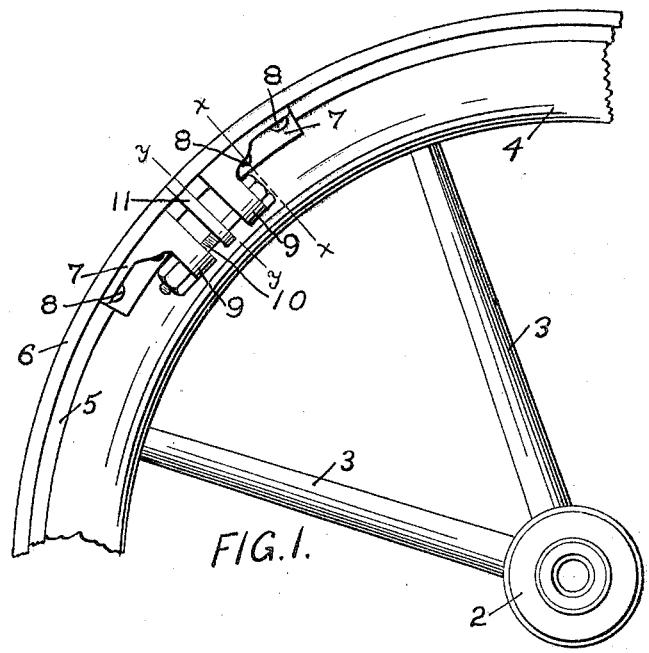
Figure 6:
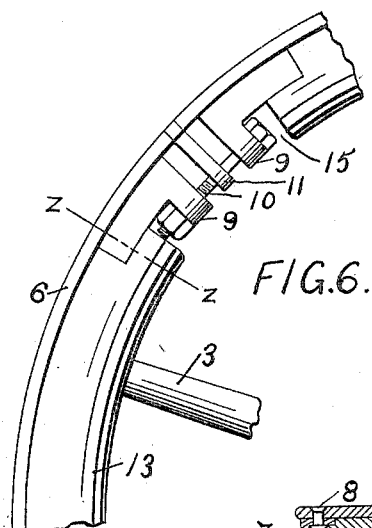
Figure 4:
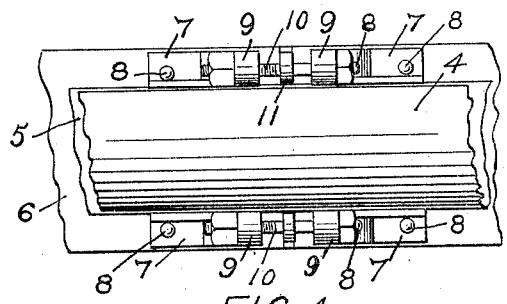
Figure 7:
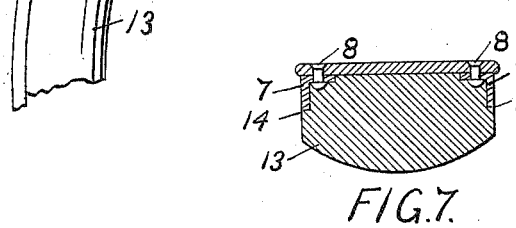
Figure 5:
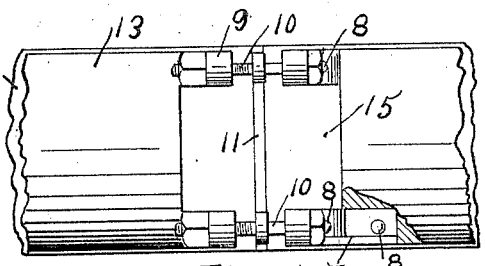

In the accompanying drawings, forming part of this specification, Figure 1 is a side elevation of a portion of a wheel, showing my improved coupling applied thereto. Fig. 2 is a transverse sectional view on the line $x\,x$ of Fig. 1. Fig. 3 is a similar view on the line $y\,y$ of Fig. 1. Fig. 4 is a detail view looking at the under side of the felly. Fig. 5 is a similar view showing the coupling adapted for use on a wide felly. Fig. 6 is a side elevation of a portion of the wheel-rim, illustrating the coupling shown in Fig. 5. Fig. 7 is a sectional view on the line $z\,z$ of Fig. 6.

In the drawings, 2 represents the hub, 3 the spokes, and 4 the felly, of a wheel.

5 represents the wheel-tire.

It is sometimes desirable where a wagon is to be used on soft ground to provide a wider tire than is ordinarily required, and I therefore provide a band or tire 6, adapted to be put on the wheel outside the tire 5 and project beyond the same on each side of the wheel. At the ends of the tire 6 I provide angle-plates 7, secured thereto by rivets 8 and having lugs 9, secured together by bolts 10. These plates are preferably arranged in pairs on each side of the wheel-felly, as shown in Fig. 2, and the tire may be provided with two couplings on opposite sides of the wheel, and in that case no rivets or bolts for securing the tire to the felly will be necessary. At any time the couplings may be loosened and the outer and wide tire removed. If desired, the wide tire can be placed on a wheel with a narrow felly and the narrow tire omitted.

It sometimes happens that the wood of the wheel-felly will be green when the tire is put on and will shrink considerably while the wheel is in use. I therefore prefer to provide a washer device 11, having holes 12 to receive the bolt 10, and adapted to fit in between the ends of the tire and close the gap between them. In case of shrinkage of the wood the washer can be removed and the coupling tightened to draw the ends of the tire together to compensate for the shrinkage. In some cases it is desirable to secure the wide tire on a wire felly, and I therefore reverse the position of the plates 7, so that the flanges thereon will be at the outer side or edge of the felly and flush therewith, the fellies being recessed, as indicated in Fig. 7, to allow the plates to be fitted snugly on them and present a neat appearance to the wheel. The wide felly I will designate by reference-numeral 13 and the recesses by numeral 14, the tire and plates being substantially the same as those described, except that the plates are turned around to allow the use of the wide felly. Where the wide felly is used, a recess 15 will be formed therein to receive the coupling and allow access to the nuts for the purpose of tightening the bolts and drawing the ends of the tire together. With this device all welding or setting of the tires is avoided, and a wheel with a narrow tread can be easily and quickly converted into one with a wide tread, or vice versa, and whenever a tire becomes loose on the wheel it will be only necessary to remove the washer, or in some cases change the position of the coupling-plates to permit the tire to be rigidly clamped on the wheel.

I claim as my invention—

1. A wheel-tire coupling comprising angle-plates arranged in pairs secured to the tire near its edges, said plates having lugs and bolts connecting them and being reversible on the tire to adapt it for use on a wide or narrow felly, substantially as described.

2. A wheel-tire coupling comprising angle-plates 7 arranged in pairs upon each side of the wheel-felly and provided with lugs having connecting-bolts 10, and said plates having a flange on one edge to adapt them for use on a wide or narrow felly, substantially as described.

3. A wheel-tire coupling comprising angle-plates secured to the tire near its edges and having lugs and bolts connecting them, and a removable washer adapted to project across and outside the felly between the ends of the tire and having arms projecting inwardly on each side of the felly and provided with holes 12 to receive said bolts, substantially as described.

In witness whereof I have hereunto set my hand this 24th day of May, 1905.

JOSEPH P. LOTZER.

Witnesses:
E. B. KENEFIX,
J. J. KICKEN.